United States Patent
Markiewicz et al.

(10) Patent No.: US 10,019,456 B2
(45) Date of Patent: Jul. 10, 2018

(54) RECOVERING FREE SPACE IN NONVOLATILE STORAGE WITH A COMPUTER STORAGE SYSTEM SUPPORTING SHARED OBJECTS

(71) Applicant: Microsoft Technology Licensing, LLC, Redmond, WA (US)

(72) Inventors: Marcus Markiewicz, Mercer Island, WA (US); Nicolas Borden, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 15/197,689

(22) Filed: Jun. 29, 2016

(65) Prior Publication Data

US 2018/0004769 A1    Jan. 4, 2018

(51) Int. Cl.
*G06F 12/10* (2016.01)
*G06F 17/30* (2006.01)
*G06F 3/06* (2006.01)

(52) U.S. Cl.
CPC ...... *G06F 17/30138* (2013.01); *G06F 3/0619* (2013.01); *G06F 3/0652* (2013.01); *G06F 3/0685* (2013.01); *G06F 17/301* (2013.01)

(58) Field of Classification Search
None
See application file for complete search history.

(56) References Cited

U.S. PATENT DOCUMENTS

| 5,813,000 A | 9/1998 | Furlani |
| 7,707,166 B1 | 4/2010 | Patterson |
| 8,290,972 B1 | 10/2012 | Deshmukh et al. |
| 8,452,731 B2 | 5/2013 | Preslan et al. |
| 8,504,533 B2 | 8/2013 | Dewey et al. |
| 8,706,822 B2 | 4/2014 | Ickman et al. |

(Continued)

FOREIGN PATENT DOCUMENTS

WO    2014047218 A2    3/2014

OTHER PUBLICATIONS

Theobald, et al., "Top-k Query Evaluation with Probabilistic Guarantees", In Proceedings of 30th International Conference on Very Large Data Base, Aug. 31, 2004, 1 page.

(Continued)

*Primary Examiner* — Duc Doan
(74) *Attorney, Agent, or Firm* — Patent GC LLC

(57) ABSTRACT

To identify objects shared by entities and to, in turn, identify free space in nonvolatile storage, a computer system uses a probabilistic data structure which tests whether an element is a member of a set. Such probabilistic data structures are created for entities in the storage system that share objects. The probabilistic data structure for an entity represents the objects that are used by that entity. When an entity is deleted, each object used by that entity is compared to the probabilistic data structures of other entities to determine if there is a likelihood that the object is used by one or more of the other entities. If the likelihood determined for an object is above an acceptable threshold, then the object is not deleted. If the likelihood determined for an object is below the set threshold, then the object can be deleted and the corresponding storage locations can be marked as free.

18 Claims, 5 Drawing Sheets

(56) References Cited

U.S. PATENT DOCUMENTS

| | | |
|---|---|---|
| 8,898,120 B1 | 11/2014 | Efstathopoulos |
| 8,924,429 B1 | 12/2014 | Fisher et al. |
| 8,965,849 B1 | 2/2015 | Goo |
| 9,075,834 B2 | 7/2015 | Serlet et al. |
| 9,110,936 B2 | 8/2015 | Li et al. |
| 9,298,604 B2 | 3/2016 | Sengupta et al. |
| 9,367,397 B1 | 6/2016 | Xie et al. |
| 2011/0307530 A1 | 12/2011 | Patterson |
| 2012/0246301 A1 | 9/2012 | Vyrros et al. |
| 2013/0159261 A1* | 6/2013 | Dewey .............. G06F 17/30156 707/692 |
| 2014/0244604 A1 | 8/2014 | Oltean et al. |
| 2014/0337314 A1 | 11/2014 | Potapov et al. |
| 2017/0235775 A1* | 8/2017 | McKenna .............. B41J 2/2132 707/741 |

OTHER PUBLICATIONS

"Binary Blob", Retrieved on: May 13, 2016, Available at: https://en.wikipedia.org/wiki/Binary_blob.

"Single-instance Storage", Retrieved on: May 13, 2016, Available at: https://en.wikipedia.org/wiki/Single-instance_storage.

"Bloom Filter", Retrieved on: May 13, 2016, Available at: https://en.wikipedia.org/wiki/Bloom_filter.

"International Search Report and Written Opinion Issued in PCT Application No. PCT/US2017/038639", dated Sep. 28, 2017, 11 Pages.

* cited by examiner

RECOVERING FREE SPACE IN NONVOLATILE STORAGE WITH A COMPUTER STORAGE SYSTEM SUPPORTING SHARED OBJECTS

BACKGROUND

In some computer storage systems, some data which are stored in nonvolatile storage devices, herein referred to as "entities", are collections of other stored data, herein referred to as "objects". In some of these storage systems, two or more entities can share an object. For example, a word processing document and a presentation document may both include a same picture, which also may be stored as a separate entity. In a system with many entities, multiple entities can share multiple objects.

It is generally a more efficient use of storage resources to store an object only once in the storage system. For example, if multiple entities reference the same object, then the data defining each of those entities can include a reference to stored data defining that object. However, after all entities that reference an object are deleted, it is desirable to identify the storage locations which store the data defining the previously shared object, so that those storage locations can be marked as free or available.

SUMMARY

This Summary is provided to introduce a selection of concepts in a simplified form that are further described below in the Detailed Description. This Summary is intended neither to identify key or essential features, nor to limit the scope, of the claimed subject matter.

To identify objects shared by entities and to, in turn, identify free space in nonvolatile storage, a computer system uses a probabilistic data structure which tests whether an element is a member of a set. Such probabilistic data structures are created for entities in the storage system that share objects. The probabilistic data structure for an entity represents the objects that are used by that entity. When an entity is deleted, each object used by that entity is compared to the probabilistic data structures of other entities to determine if there is a likelihood that the object is used by one or more of the other entities. If the likelihood determined for an object is above an acceptable threshold, then the object is not deleted. If the likelihood determined for an object is below the threshold, then the object can be deleted and the corresponding storage locations can be marked as free.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
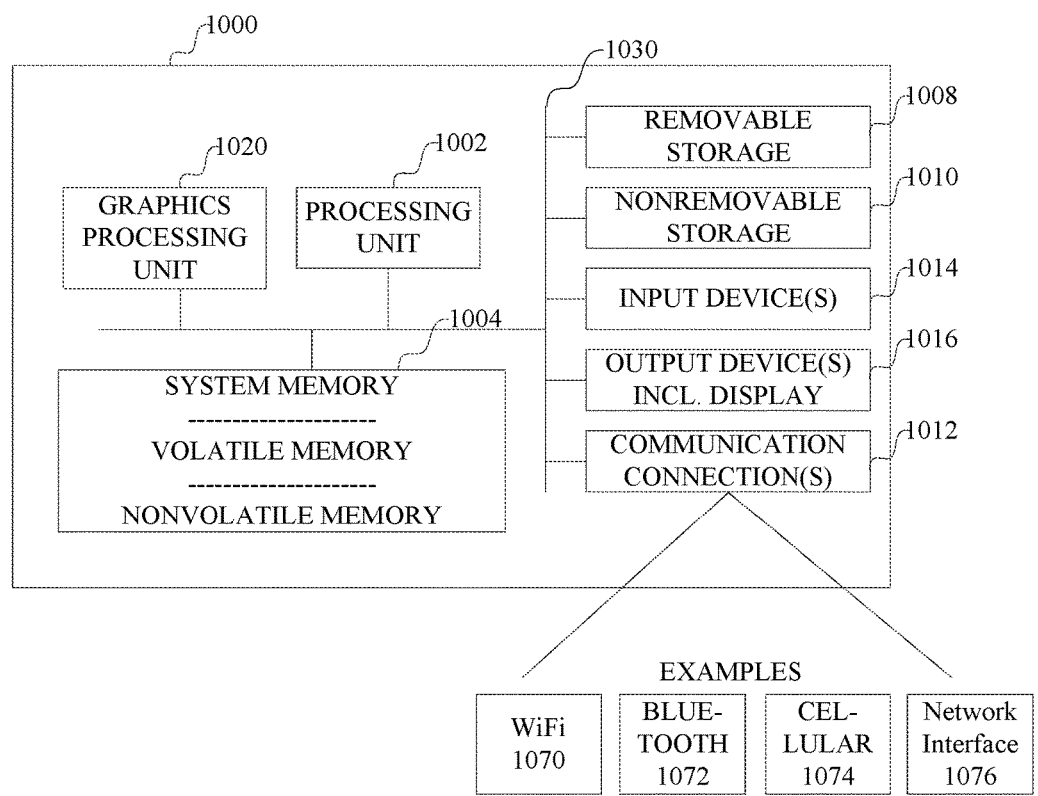
FIG. 1 is a block diagram of an example computer.

FIG. 1 illustrates an example of a computer with which techniques described herein can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 1, a computer 1000 includes a processing system at least one processing unit 1002 and memory 1004. The computer can have multiple processing units 1002 and multiple devices implementing the memory 1004. A processing unit 1002 comprises a processor, which is logic circuitry which responds to and processes instructions to provide the functions of the computer. A processing unit can include one or more processing cores (not shown) that are processors within the same logic circuitry that can operate independently of each other. Generally, one of the processing units in the computer is designated as a primary processing unit, typically called the central processing unit (CPU). Additional co-processing units, such as a graphics processing unit (GPU), also can be present in the computer. A co-processing unit comprises a processor that performs operations that supplement the central processing unit, such as but not limited to graphics operations and signal processing operations.

The memory 1004 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 1000 can include additional computer storage devices (whether removable or non-removable) such as, but not limited to, magnetically-recorded or optically-recorded disks or tape. Such additional computer storage devices are illustrated in FIG. 1 by removable storage device 1008 and non-removable storage device 1010. Such computer storage devices 1008 and 1010 typically are nonvolatile storage devices. The various components in FIG. 1 are generally interconnected by an interconnection mechanism, such as one or more buses 1030.

A computer storage device is any device in which data can be stored in and retrieved from addressable physical storage locations by the computer. A computer storage device thus can be a volatile or nonvolatile memory, or a removable or non-removable storage device. Memory 1004, removable storage 1008 and non-removable storage 1010 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are mutually exclusive categories of media, and are distinct from the signals propagating over communication media.

Computer 1000 may also include communications connection(s) 1012 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 1012 are devices, such as a wired network interface, wireless network interface, radio frequency transceiver, e.g., WiFi 1070, cellular 1074, long term evolution (LTE) or Bluetooth 1072, etc., transceivers, navigation transceivers, e.g., global positioning system (GPS) or Global Navigation Satellite System (GLONASS), etc., or network interface devices 1076, e.g., Ethernet, etc., or other devices that interface with communication media to transmit data over and receive data from the communication media.

The computer 1000 may have various input device(s) 1014 such as a pointer device, keyboard, touch-based input device, pen, camera, microphone, sensors, such as accelerometers, thermometers, light sensors and the like, and so on. The computer 1000 may have various output device(s) 1016 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 1008 and 1010, communication connections 1012, output devices 1016 and input devices 1014 can be integrated within a housing with the rest of the computer, or can be connected through various input/output interface devices on the computer, in which case the reference numbers 1008, 1010, 1012, 1014 and 1016 can indicate either the interface for connection to a device or the device itself as the case may be.

A computer generally includes an operating system, which is a computer program that manages access, by applications running on the computer, to the various resources of the computer. There may be multiple applications. The various resources include the memory, storage, input devices and output devices, such as display devices and input devices as shown in FIG. 1. To manage access to data stored in nonvolatile computer storage devices, the computer also generally includes a file system maintains files of data. A file is a named logical construct which is defined and implemented by the file system to map a name and a sequence of logical records of data to the addressable physical locations on the computer storage device. Thus, the file system hides the physical locations of data from applications running on the computer, allowing applications access data in a file using, the name of the file and commands defined by the file system. A file system provides basic file operations such as creating a file, opening a file, writing a file, reading a file and closing a file.

The various modules, tools, or applications, and data structures and flowcharts of FIGS. 2 through 7, as well as any operating system, file system and applications on a computer in FIG. 1, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Given such a computer as shown in FIG. 1, the data that are stored in the nonvolatile storage devices, herein referred to as "entities", are collections of large binary data objects, herein referred to as "objects". Two or more entities can share an object. For example, a word processing document and a presentation document may both include a same picture, which also may be stored as a separate entity. In a system with many entities, multiple entities share multiple objects.

The sharing of objects stored in nonvolatile storage, by stored entities, can be implemented in a number of ways.

In one example implementation, each object is stored as a binary large object (BLOB), and each entity is defined as a collection of such binary large objects.

In one example implementation, the file system can define a file as a set of logical blocks, each of which is stored in corresponding physical storage locations in nonvolatile storage. The file system can define files that share logical blocks. In such an implementation, a file is an entity and the logical blocks are the objects that can be shared.

In another example implementation, a storage management system that uses a file system can manage storage of data by using files, or portions of files, of the file system as objects that can be shared. For example, a storage management system may store different versions of a word processing document as a combination of files. A first version of a word processing document can be stored as a first file. A second version of the word processing document can be stored as a combination of the first file and a second file that stores data representing changes to the first file. As another example, the storage management system may allow different documents, such as a word processing document and a presentation document, to both include another document or portion of a document, such as a picture. The picture also may be stored as a separate entity. In such an implementation, a file or portion of a file in the file system is an object that can be shared, and the storage management system manages entities as combinations of files. In such a storage management system an entity in the file system also can be an object included another entity.

In another example implementation, the operating system or storage subsystem abstracts information about storage of data on the computer storage device from the file system, such that the file system does not have information indicating whether a logical block of data is shared between two files. Instead, the storage subsystem tracks information about whether a logical block of data is shared.

Generally speaking, with a variety of ways in which entity data can be stored so as to represent sharing of stored objects, there is generally some data associated with each object so that the object can be distinguished from other objects in the storage system. Any such data that can be used to distinguished one object from another can be referred to as an object identifier.

Figure 2:
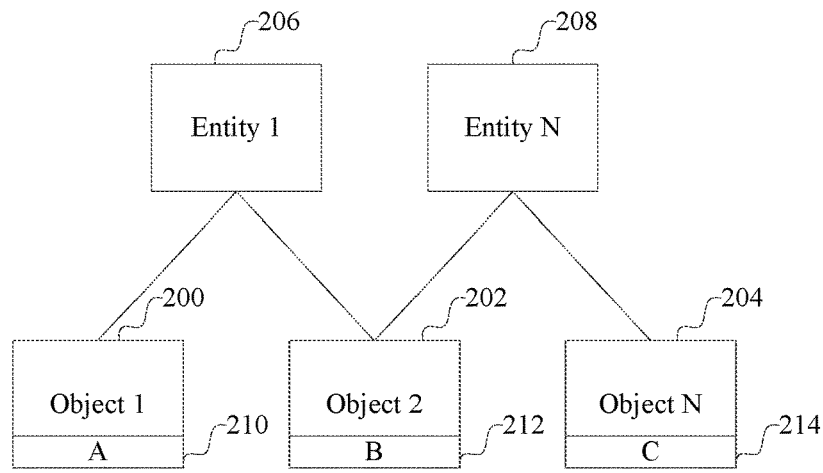
FIG. 2 is an illustrative example of entities sharing an object in persistent storage.

An illustrative example of entities sharing objects is shown in FIG. 2. In FIG. 2, a first object 200, a second object 202 and a third object 204 are shown. Also shown are a first entity 206 and a second entity 208. The first entity 206 includes the first object 200 and the second object 202. The second entity 208 includes the second object 202 and the third object 204. Thus, the first entity 206 and the second entity 208 share the second object 202.

It can be seen in FIG. 2 that it is generally a more efficient use of storage resources to store an object only once in the storage system. For example, by having the first entity 206 and second entity 208 share the second object 202, then the data defining the second object 202 is stored only once. Instead of storing copies of that data, the first entity 206 and second entity 208 each store data that includes a reference to the stored data defining the second object 202. A challenge that arises in such a system is identifying objects which are no longer used, and for which storage locations can be freed, after an entity is deleted, in a way that does not involve inspecting each object to make such a determination. For example, if only the second entity 208 is deleted, the data defining the third object 204 can be deleted; however, the data defining the second object 202 cannot be deleted because it remains shared with the first entity 206.

To address such a challenge involves defining a data representation for the entities and objects that does not in itself consume substantial storage yet also can be processed in an efficient manner to identify objects that can be deleted. The storage locations in which an unused object is stored can be freed for use for storing other objects.

As will now be described by way of an illustrative example in connection with FIGS. 2 and 3, a probabilistic data structure is defined for each entity and represents the objects included in that entity. More particularly, given an identifier of an object, the probabilistic data structure for an entity tests whether the object is a member of a set objects included in the entity. The test determines a likelihood that the object is included in the entity. By selecting a data structure which does not produce false negative results to a query, a query on the data structure for an entity for an object returns an indication that the object is possibly in the set of objects for that entity or is definitely not in the set of objects for that entity. In other words, the probabilistic data structure for an entity, when queried with an identifier of an object, outputs a likelihood that the object is a member of a set objects included in the entity without allowing a false negative result. An example of such a probabilistic data structure is a Bloom filter.

Using such a probabilistic data structure for each entity, when an entity is deleted, each object used by that entity can be compared to the probabilistic data structures for other entities to determine if there is a likelihood that the object is used by one or more of the other entities. If the likelihood determined for an object is above an acceptable threshold, then the object is not deleted. If the likelihood determined for an object is below the set threshold, then the object can be deleted and the corresponding storage locations can be marked as free.

For probabilistic data structures such as a Bloom filter for which there are no false negatives, the threshold can be set as low as zero; however such a threshold likely will result in few objects being deleted. A threshold can be set based on the probability of a false positive result, which is a function of the number I of mapping functions $F_i$, the number N of elements in the Bloom filter array, and the number of objects represented in the Bloom filter array. The threshold can be set to correspond to a sufficiently low false positive probability. The threshold can be adaptive based on numbers of objects shared by entities stored in the storage system.

Figure 3:
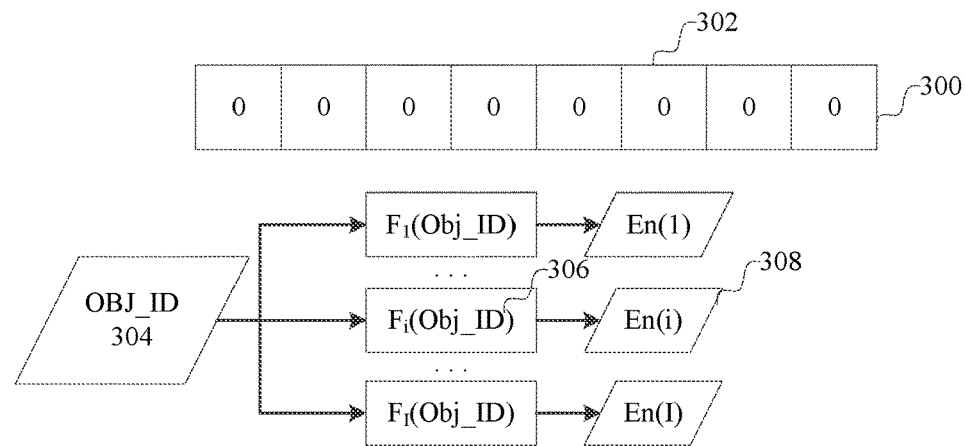
FIG. 3 is an illustrative example of generating a probabilistic data structure.
Figure 4:
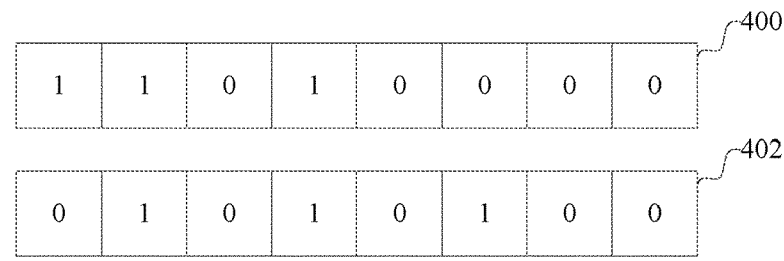
FIG. 4 is an illustrative example of probabilistic data structures for entities of FIG. 2.

FIG. 3 presents an illustrative example of a Bloom filter; FIG. 4 presents an illustrative example of a Bloom filter of FIG. 3 representing entities and objects of FIG. 2. A Bloom filter comprises an array 300 (herein called the "Bloom filter array") of a positive integer number N of elements, e.g., 302. For a Bloom filter, each element is a single bit. Initially, all bits are set to an initial value, e.g., zero (0). A positive integer number I of functions $F_i(Obj\_ID)$ (i=1 to I) (e.g., 306) are used to map an identifier representing an object (Obj_ID) 304 to elements 302 of the array, where each function $F_i$ maps the identifier (Obj_ID) of the object to an element En(i), where En=1 to N (e.g., 308) representing the En-th element of the array. Typically, the number I of functions is much smaller than the number N of elements in the array.

To generate a Bloom filter array for an entity, each object included in the entity is added to the set represented by the Bloom filter array for that entity. Given an object identifier for an object, each function $F_i$ is applied to the object identifier to map the object identifier to an element of the array. The elements of the array resulting from applying multiple functions to the object identifier are then set to a value other than the initial value, e.g., one (1).

As an example, turning now to FIG. 4, an example Bloom filter array generated for a first entity (206 in FIG. 2) is shown at 400, and for a second entity (208 in FIG. 2) is shown at 402. In this example, it is assumed that the number I of functions is two (2) and the number N of elements is eight (8). The object identifier 210 (e.g., "A") of the first object 200 is mapped to element 1 and element 2. The object identifier 212 (e.g., "B") of the second object 202 is mapped to element 2 and 4. The object identifier 214 (e.g., "C") of the third object 204 is mapped to element 4 and 6. Thus, the Bloom filter array 400 for the first entity 206 has elements 1, 2 and 4 set; the Bloom filter array 402 for the second entity 208 has elements 2, 4 and 6 set.

To determine whether an object is included in an entity, each of the functions $F_i$ is applied to the object identifier for the object. The union of the results of applying these functions is a set of elements. This set of elements is compared to the array representing the objects in an entity. If the value in any element in the array for an entity is "0" for any element in the set of elements resulting from applying the set of functions $F_i$ to the object identifier, then the object is not included in the set of objects for that entity. Otherwise, all values of those elements are "1", and then there is a positive likelihood that the object may be included in that entity. The likelihood is dependent on the number I of mapping functions $F_i$, the number N of elements in the Bloom filter array, and the number of objects represented in the Bloom filter array.

Figure 5:
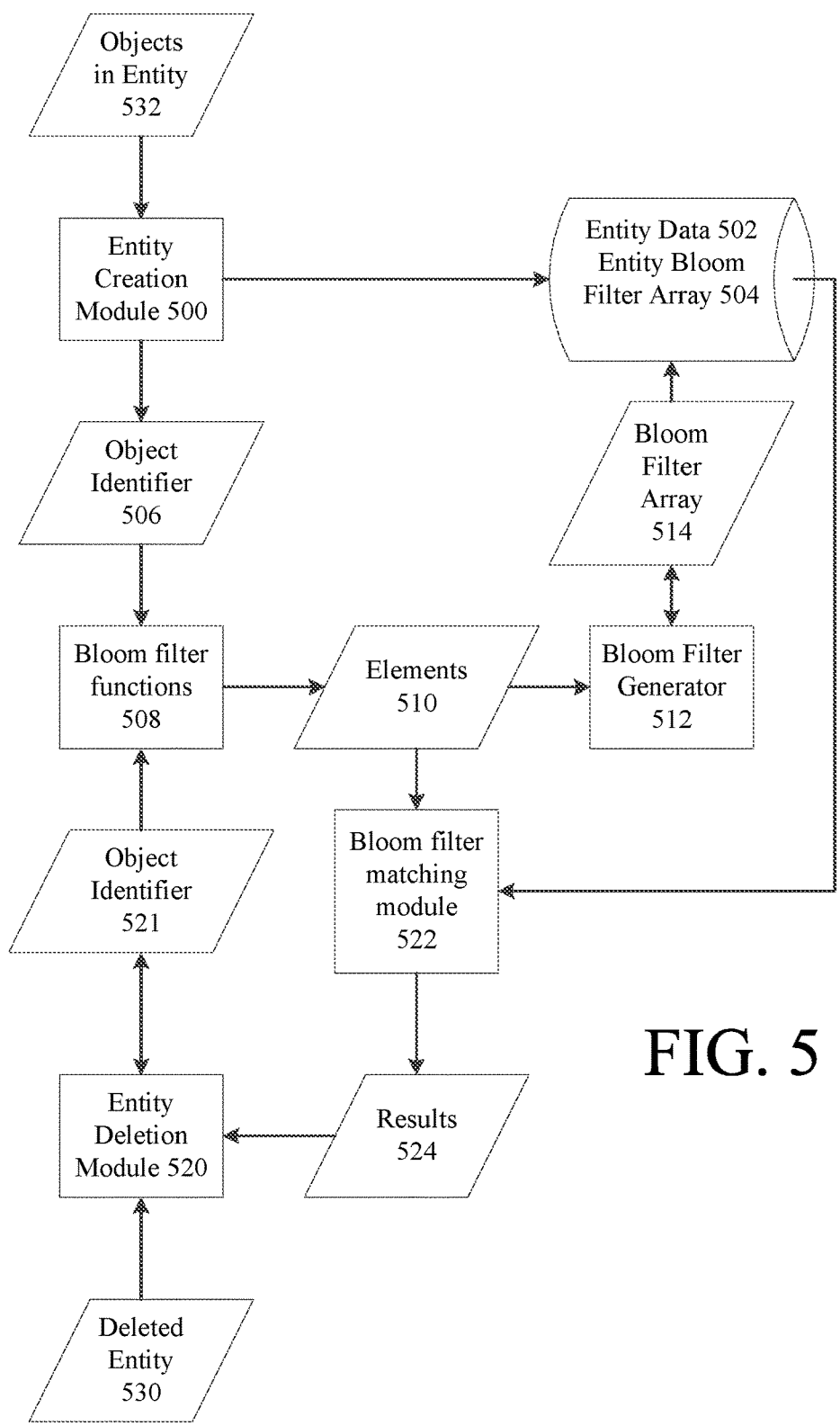
FIG. 5 is a data flow diagram of an example implementation of Bloom filters.

Turning now to FIG. 5, a data flow diagram of a storage system using such a probabilistic data structure will now be described. In such a storage system, operations of interest are creating a new entity and deleting an entity. In the examples that follow, it is assumed that an entity, once created, is not modified. For example, in systems in which documents are edited, different versions of the document can be created, and the different versions can share objects. Thus, the Bloom filter array generated for an entity is not changed after the entity is created.

In FIG. 5, an entity creation module 500 stores data 502 defining an entity, which can be, for example, performed in response to a command to create an entity, which can include an indication of a set of objects 532 used by the entity. The data 502 defining an entity includes a Bloom filter array 504 generated for that entity. The Bloom filter array 504 is generated by the entity creation module 500 providing a sequence of object identifiers 506 included in the entity to Bloom filter functions 508. Each of the Bloom filter functions is applied to an object identifier 506 to output data identifying the elements 510 of the Bloom filter array which should be set. A Bloom filter array generator 512 sets the appropriate elements of a Bloom filter array 514 for the entity. After all of the objects included in the entity are processed, the Bloom filter array can be stored, as indicated at 504.

The Bloom filter arrays for the entities stored in a storage system can be stored independently of the entities themselves. In some implementations, the Bloom filter arrays can be maintained in memory of the storage system. In some implementations, they can be stored in structured storage if the amount of storage used is sufficiently low, so as to minimize input/output operations when accessing the data. For example, the Bloom filter arrays for multiple entities can be stored in a B-tree in structured storage.

In FIG. 5, an entity deletion module 520 is operated in response to an instruction to delete an entity, which results in the data 502 defining an entity being deleted. In addition to deleting the entity, the computer storage system identifies whether deletion of the entity results in any objects being unused, allowing the corresponding storage locations to be marked as free. The entity deletion module may receive data identifying the objects used by the entity, for example by receiving an identifier 530 for the entity, or a list of objects used by the entity. The entity deletion module 520 provides a sequence of object identifiers 521 included in the deleted entity to the Bloom filter functions 508. Each of the Bloom filter functions is applied to an object identifier 521 to output data identifying the elements 510 of the Bloom filter array which correspond to that object. A Bloom filter matching module 522 compares the outputs of the Bloom filter functions 508 as applied to the object identifier 506 to the Bloom filter arrays 504 for each remaining entity in the storage system, to provide a match result 524 for each entity for each object. The match result for an object and an entity indicates a likelihood that the object is used by the entity. If the likelihood determined for an object for any entity is above an acceptable threshold, then the object is not deleted. The entity deletion module 520 can delete the corresponding object based on the match result 524 from the Bloom filter matching module 522.

Figure 6:
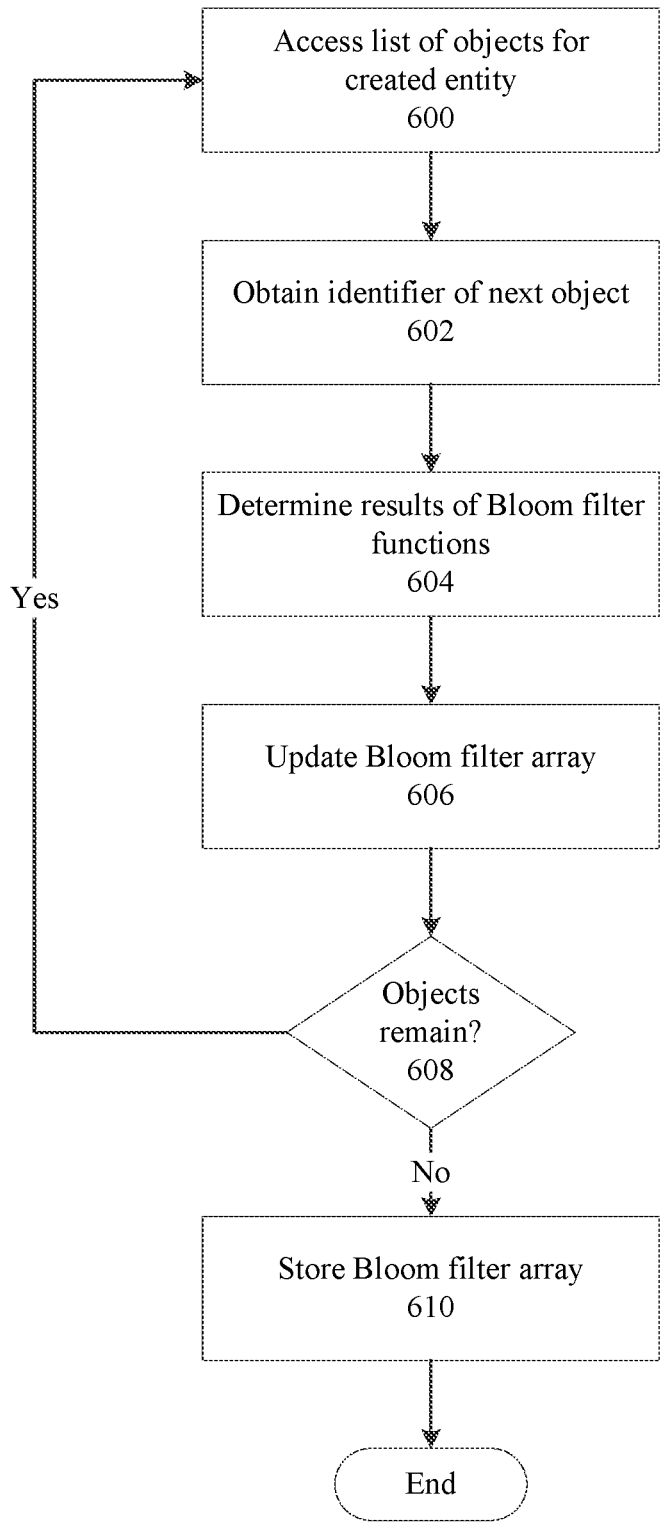
FIG. 6 is a flow chart describing an example implementation of creating an entity.

Turning now to FIG. 6, a flow chart of an example implementation of an operation for creating an entity will now be described.

In response to a request to create an entity including a plurality of objects, the storage system accesses 600 a list of objects included in the entity. An identifier of a next object in the list is obtained 602 and the results of the Bloom filter functions are determined 604. The Bloom filter array is updated 606 based on the results of the Bloom filter functions for the current object. If other objects of the entity remain to be processed, as determined at 608, then the process repeats with the next object, as indicated at 602. The complete Bloom filter array is then stored 610 for the entity.

Figure 7:
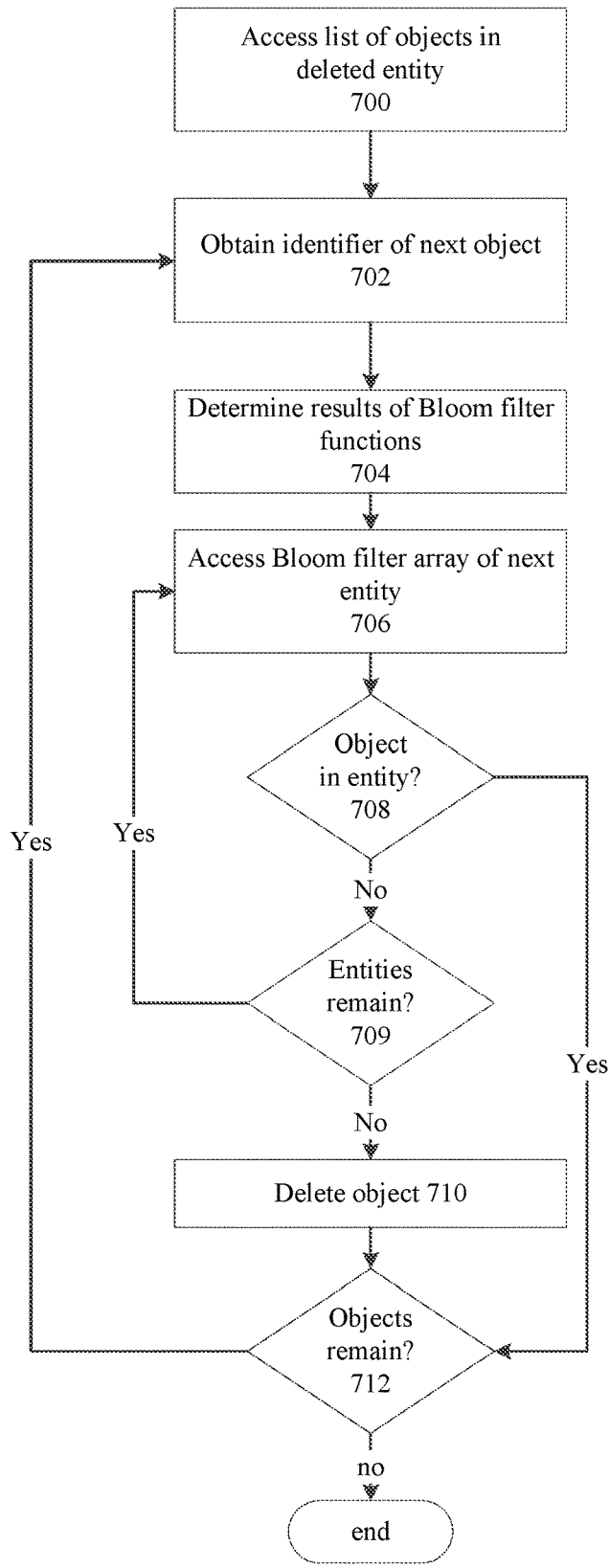
FIG. 7 is a flow chart describing an example implementation of deleting an entity.

Turning now to FIG. 7, a flow chart of an example implementation of an operation for deleting an entity will now be described.

In response to a request to delete an entity including a plurality of objects, the storage system accesses 700 a list of objects included in the entity. An identifier of a next object in the list is obtained 702 and the results of the Bloom filter functions are determined 704. The Bloom filter array for a next entity in the storage system is accessed 706. If the comparison of the results of the object's Bloom filter functions with the Bloom filter array for the current entity is greater than the selected threshold, and thus the object is determined to be likely included in the entity, as determined at 708, then the processing of the current object can stop. Because it is likely the current object is included in an entity, it is not deleted. The process can continue with any remaining objects, as indicated at 712 and 702. Otherwise, the object is determined not to be included in the current entity, and if entities remain as determined at 709, then processing continues with the next entity as indicated at 706. If all of the entities are processed and the object is not included in the remaining entities, then the object can be deleted, as indicated at 710. If other objects of the deleted entity remain to be processed, as determined at 712, then the process repeats with the next object, as indicated at 702.

While the foregoing processes illustrated in FIGS. 6 and 7 are described sequentially, in some implementations the processing of object identifiers can be performed in parallel, and the comparisons over multiple entities can be performed in parallel.

By using such a probabilistic data structure for each entity, and comparing an object of a deleted entity to the probabilistic data structures for entities, an analysis of all stored objects can be avoided. Representation of each entity as a relatively small data structure reduces computation, input/output and memory utilization. The representation also can be kept memory-resident and can be tied to the lifetime of an entity in the system, allowing for decisions to be made without incurring input and output operations at each decision point.

Accordingly, in one aspect, a computer comprises a nonvolatile storage device and a processing system comprising a processing unit and a memory. A plurality of objects are stored on the nonvolatile storage device. A plurality of entities are stored on the nonvolatile storage device. An entity comprises one or more of the stored plurality of objects, wherein a first entity and a second entity can share objects. The processing system, in response to creating a first entity comprising a first set of the objects, generates a first probabilistic data structure representing inclusion of the first set of the objects in the first entity. The processing system, in response to creating a second entity comprising a second set of the objects, generates a second probabilistic data structure representing inclusion of the second set of the objects in the second entity. The processing system, in response to deleting the second entity, for each object in the second set of the objects, applies the first probabilistic data structure to determine if the object likely is in the first set of the objects.

In another aspect, a computer-implemented process is performed by a computer program executing on a computer, the computer comprising a nonvolatile storage device, a plurality of objects stored on the nonvolatile storage device, and a plurality of entities stored on the nonvolatile storage device, wherein an entity comprises one or more of the stored plurality of objects, wherein a first entity and a second entity can share objects. In response to creating a first entity comprising a first set of the objects, a first probabilistic data structure is generated representing inclusion of the first set of objects in the first entity. In response to creating a second entity comprising a second set of the objects, a second probabilistic data structure is generated representing inclusion of the second set of objects in the second entity. In response to deleting the second entity, for each object in the second set of objects, the first probabilistic data structure is applied to determine if the object likely is in the first set of objects.

In another aspect, a computer comprises a nonvolatile storage device storing objects and entities as sets of objects, wherein entities can share objects. The computer includes means for creating probabilistic data structures for the entities based on the objects included in the entities, the probabilistic data structure for an entity providing, in response to an indication of object, a likelihood that the object is included in the entity, and means, responsive to deletion of an entity, for determining whether objects included in the entity can be deleted using the probabilistic data structures of other entities.

In any of the foregoing aspects, the probabilistic data structure can be a Bloom filter.

In any of the foregoing aspects, objects and entities can be different forms of data depending on the storage system. For example, the first entity and the second entity can be files in a file system. As another example, the plurality of objects can be blocks of data of files in the file system. As another example, the first entity and the second entity can be entities maintained by a storage management system that stores objects in files of a file system.

In any of the foregoing aspects, the processing system can be further configured to, in response to a determination that the object is not included in another entity, delete the object.

In any of the foregoing aspects, the probabilistic data structure for an entity, when queried with an identifier of an object, can output a likelihood that the object is a member of a set objects included in the entity without allowing a false negative result.

In another aspect, an article of manufacture includes at least one computer storage device, and computer program instructions stored on the at least one computer storage device. The computer program instructions, when processed by a processing system of a computer, the processing system comprising a processing unit and a storage device, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer comprising:
   a nonvolatile storage device;
   a plurality of objects stored on the nonvolatile storage device;
   a plurality of entities stored on the nonvolatile storage device, wherein each entity includes one or more of the stored plurality of objects, wherein at least a first entity and a second entity of the plurality of entities can share objects;
   a processing system comprising a processing unit and a memory, the processing system configured to:
   in response to creating the first entity comprising a first set of the objects, generate a first probabilistic data structure representing inclusion of the first set of the objects in the first entity;
   in response to creating the second entity comprising a second set of the objects, generate a second probabilistic data structure representing inclusion of the second set of the objects in the second entity; and
   in response to deleting the second entity, for each object in the second set of the objects:
   for each entity of the plurality of entities, apply a probabilistic data structure of the entity to the object to determine if the object likely is included in the entity, and
   in response to a determination that the object is not likely included in any entity in the plurality of entities, delete the object.

2. The computer of claim 1, wherein the first probabilistic data structure comprises an array of a Bloom filter.

3. The computer of claim 1, wherein the first entity and the second entity are files in a file system.

4. The computer of claim 3, wherein the plurality of objects comprises blocks of data of files in the file system.

5. The computer of claim 1, wherein the first entity and the second entity are entities maintained by a storage management system that stores objects in files of a file system.

6. The computer of claim 1, wherein the probabilistic data structure for an entity, when queried with an identifier of an object, outputs a likelihood that the object is a member of a set objects included in the entity without allowing a false negative result.

7. An article of manufacture comprising:
a computer storage device,
computer program instructions stored on the computer storage device which, when processed by a processing system of a computer, the processing system comprising a processing unit and a memory, configures the computer to be comprising:
a nonvolatile storage device;
a plurality of objects stored on the nonvolatile storage device;
a plurality of entities stored on the nonvolatile storage device, wherein each entity includes one or more of the stored plurality of objects, wherein at least a first entity and a second entity of the plurality of objects can share objects;
the processing system configured to:
in response to creating the first entity comprising a first set of the objects, generate a first probabilistic data structure representing inclusion of the first set of the objects in the first entity;
in response to creating the second entity comprising a second set of the objects, generate a second probabilistic data structure representing inclusion of the second set of the objects in the second entity; and
in response to deleting the second entity, for each object in the second set of the objects:
for each entity of the plurality of entities, apply a probabilistic data structure of the entity to the object to determine if the object likely is included in the entity, and
in response to a determination that the object is not likely included in any entity in the plurality of entities, delete the object.

8. The article of manufacture of claim 7, wherein the first probabilistic data structure comprises an array of a Bloom filter.

9. The article of manufacture of claim 7, wherein the first entity and the second entity are files in a file system.

10. The article of manufacture of claim 9, wherein the plurality of objects comprises blocks of data of files in the file system.

11. The article of manufacture of claim 7, wherein the first entity and the second entity are entities maintained by a storage management system that stores objects in files of a file system.

12. The article of manufacture of claim 7, wherein the probabilistic data structure for an entity, when queried with an identifier of an object, outputs a likelihood that the object is a member of a set objects included in the entity without allowing a false negative result.

13. A computer-implemented process performed by a computer program executing on a computer, the computer comprising a processing system, comprising a processing unit and a memory, and a nonvolatile storage device, a plurality of objects stored on the nonvolatile storage device, and a plurality of entities stored on the nonvolatile storage device, wherein each entity includes one or more of the stored plurality of objects, wherein a first entity and a second entity in the plurality of objects can share objects, the computer-implemented process comprising:
in response to creating the first entity comprising a first set of the objects, generating a first probabilistic data structure representing inclusion of the first set of the objects in the first entity;
in response to creating the second entity comprising a second set of the objects, generating a second probabilistic data structure representing inclusion of the second set of the objects in the second entity; and
in response to deleting the second entity, for each object in the second set of the objects:
for each entity of the plurality of entities, apply a probabilistic data structure of the entity to the object to determine if the object likely is included in the entity, and
in response to a determination that the object is not likely included in any entity in the plurality of entities, delete the object.

14. The computer-implemented process of claim 13, wherein the first probabilistic data structure comprises an array of a Bloom filter.

15. The computer-implemented process of claim 13, wherein the first entity and the second entity are files in a file system.

16. The computer-implemented process of claim 13, wherein the plurality of objects comprises blocks of data of files in the file system.

17. The computer-implemented process of claim 13, wherein the first entity and the second entity are entities maintained by a storage management system that stores objects in files of a file system.

18. The computer-implemented process of claim 13, wherein the probabilistic data structure for an entity, when queried with an identifier of an object, outputs a likelihood that the object is a member of a set objects included in the entity without allowing a false negative result.

* * * * *